US011853886B2

(12) United States Patent
Schmidhuber

(10) Patent No.: US 11,853,886 B2
(45) Date of Patent: Dec. 26, 2023

(54) RECURRENT NEURAL NETWORK AND TRAINING PROCESS FOR SAME

(71) Applicant: Nnaisense SA, Lugano (CH)

(72) Inventor: Hans Jürgen Schmidhuber, Savosa (CH)

(73) Assignee: Nnaisense SA, Lugano (CH)

( * ) Notice: Subject to any disclaimer, the term of this patent is extended or adjusted under 35 U.S.C. 154(b) by 0 days.

(21) Appl. No.: 17/937,060

(22) Filed: Sep. 30, 2022

(65) Prior Publication Data

US 2023/0026739 A1     Jan. 26, 2023

Related U.S. Application Data

(63) Continuation of application No. 16/229,050, filed on Dec. 21, 2018, now abandoned.

(60) Provisional application No. 62/608,856, filed on Dec. 21, 2017.

(51) Int. Cl.
*G06N 3/08*     (2023.01)
*G06N 3/044*     (2023.01)

(52) U.S. Cl.
CPC ............. *G06N 3/08* (2013.01); *G06N 3/044* (2023.01)

(58) Field of Classification Search
CPC .............................. G06N 3/08; G06N 3/0445
See application file for complete search history.

(56) References Cited

U.S. PATENT DOCUMENTS

2016/0321522 A1*   11/2016   Yuan ................. G06V 10/774
2018/0144214 A1*    5/2018   Hsieh ................... G06N 3/04

OTHER PUBLICATIONS

Schmidhuber, J. (2013). Powerplay: Training an increasingly general problem solver by continually searching for the simplest still unsolvable problem. Frontiers in psychology, 4, 313. (Year: 2013).*
Stadie, B. C., Levine, S., & Abbeel, P. (2015). Incentivizing exploration in reinforcement learning with deep predictive models. arXiv preprint arXiv:1507.00814. (Year: 2015).*
Hans Jürgen Schmidhuber; "On Learning to Think: Algorithmic Information Theory for Novel Combinations of Reinforcement Learning Controllers and Recurrent Neural World Models"; The Swiss AI Lab; Istituto Dalle Molle di Studi sull'Intelligenza Artificiale; Nov. 30, 2015.

(Continued)

*Primary Examiner* — Ying Yu Chen
*Assistant Examiner* — Lokesha G Patel
(74) *Attorney, Agent, or Firm* — Sheehan Phinney; Bass & Green PA

(57) ABSTRACT

In a computer system that includes a trained recurrent neural network (RNN), a computer-based method includes: producing a copy of the trained RNN; producing a version of the RNN prior to any training; trying to solve a control task for the RNN with the copy of the trained RNN and with the untrained version of the RNN; and in response to the copy of the trained RNN or the untrained version of the RNN solving the task sufficiently well: retraining the trained RNN with one or more traces (sequences of inputs and outputs) from the solution; and retraining the trained RNN based on one or more traces associated with other prior control task solutions, as well as retraining the RNN based on previously observed traces to predict environmental inputs and other data (which maybe consequences of executed control actions).

23 Claims, 4 Drawing Sheets

(56) References Cited

OTHER PUBLICATIONS

Hans Jürgen Schmidhuber; "PowerPlay: training an increasingly general problem solver by continually searching for the simplest still unsolvable problem"; The Swiss AI Lab IDSIA, University of Lugano, SUPSI, Lugano, Switzerland; Jun. 7, 2013.
J. Schmidhuber. Learning complex, extended sequences using the principle of history compression. Neural Computation, 4(2):234-242, 1992.
Srivastava R. K., Steunebrink B. R., Schmidhuber J. (2013). First Experiments with PowerPlay. Neural Netw. 41, 130-136 10.1016/j.neunet.2013.01.022.
Glen Berseth et al; Progressive Reinforcement Learning With Distillation for Multi-Skilled Motion Control; Published as a conference paper at ICLR 2018.
J. Schmidhuber. et al; Sequential neural text compression. IEEE Transactions on Neural Networks, 7(1):142-146, 1996.
Stadie, B. C., et al Incentivizating exploration in reinforcement learning with deep predictive models. 2015.

\* cited by examiner

RECURRENT NEURAL NETWORK AND TRAINING PROCESS FOR SAME

CROSS-REFERENCE TO RELATED APPLICATION(S)

This application is a continuation of application Ser. No. 16/229,050, entitled RECURRENT NEURAL NETWORK AND TRAINING PROCESS FOR SAME, which was filed Dec. 21, 2018, which claims the benefit of priority to U.S. Provisional Patent Application No. 62/608,856, entitled One Big Net for Everything, which was filed on Dec. 21, 2017, the disclosure of which is incorporated by reference herein in its entirety.

FIELD OF THE INVENTION

This disclosure relates to a recurrent neural network (referred to herein as ONE) and a process for training the recurrent neural network.

BACKGROUND

To become a general problem solver that is able to run arbitrary problem-solving programs, a control system for a robot or an artificial agent can be implemented as a computer-based artificial recurrent neural network (RNN). A typical RNN consists of many simple, connected processors called neurons (or units), each producing a sequence of real-valued activations. Input neurons generally get activated through sensors (e.g., in the external agent or otherwise) sensing or perceiving various aspects of the environment outside of the RNN, other neurons generally get activated through weighted connections or wires from previously active neurons, and some neurons may affect or influence the environment by triggering or causing actions outside the RNN. In general, learning or credit assignment is about finding real-valued weights for the RNN that make the RNN exhibit desired behaviors, such as being able to drive or command the driving of a car. In general terms, the weight matrix of an RNN may be considered its program.

Many RNN-like models can be used to build computers, e.g., RNNs controlling pushdown automata or other types of differentiable memory, including differentiable fast weights, as well as closely related RNN-based meta-learners. In this application, we may refer to all of them as RNNs. In practical applications, many RNNs are Long Short-Term Memory (LSTM) networks, and may be used, for example, for automatic translation, speech recognition, and many other tasks. If there are large 2-dimensional inputs such as video images, for example, the LSTM may have a front-end in form of a convolutional neural net (CNN) implemented on fast graphics processing units GPUs. Such a CNN-LSTM combination may be considered an RNN for purposes of the current disclosure.

Without a teacher, reward-maximizing programs of an RNN, for example, can be learned through repeated trial and error, e.g., through artificial evolution, or reinforcement learning through policy gradients. The search space often can be reduced dramatically by evolving compact encodings of RNNs. Nevertheless, this can be quite difficult and complex.

SUMMARY OF THE INVENTION

In one aspect, a computer-based method is disclosed that takes place in a computer system that includes a trained recurrent neural network (RNN), referred to herein as ONE. ONE is trained on a sequence of tasks of control and prediction. The computer-based method includes: producing a copy of the trained RNN; producing a version of the RNN prior to any training; trying to solve a task for the RNN with the copy of the trained RNN and with the untrained version of the RNN; and in response to the copy of the trained RNN or the untrained version of the RNN solving the task sufficiently well: retraining the trained RNN with one or more traces from the solution; and retraining the trained RNN based on one or more traces associated with other prior task solutions. Here the RNN not only learns more and more control tasks in a given environment, but also learns to predict better and better the environmental inputs and the consequences of executed control actions.

In some implementations, one or more advantages are present.

For example, in some implementations, a single recurrent neural network (RNN) (ONE) can efficiently and effectively solve a new control task without a teacher, while preserving its ability to solve previously-learned, still relevant control tasks. Moreover, the single recurrent neural network (ONE) can learn how to make better predictions over time. In various implementations, the control units of ONE can leverage modeling or predicting units of ONE, and vice versa.

Supervised learning in large LSTMs works so well that it has become highly commercial. True artificial intelligence, however, should continually learn to solve more and more complex control problems in partially observable environments without a teacher. This application shows some ways that a single recurrent neural network (called ONE) can incrementally absorb more and more control and prediction skills through efficient gradient descent-based compression of desirable behaviors, including behaviors of control policies learned by past instances of ONE through neuroevolution or similar general but slow techniques. Ideally, none of the "holy data" from all trials is ever discarded; all can be used to incrementally make ONE an increasingly general problem solver able to solve more and more control and prediction tasks.

Moreover, in a typical implementation, during ONE's training and evolution (described herein), gradient-based compression of policies and data streams simplifies ONE, squeezing the essence of ONE's previously learned skills and knowledge into the code implemented within the recurrent weight matrix of ONE itself. This can improve ONE's ability to generalize and quickly learn new, related tasks when it is awake.

Other features and advantages will be apparent from the description and drawings, and from the claims.

BRIEF DESCRIPTION OF THE DRAWINGS

Like reference characters refer to like elements.

DETAILED DESCRIPTION

Figure 1:
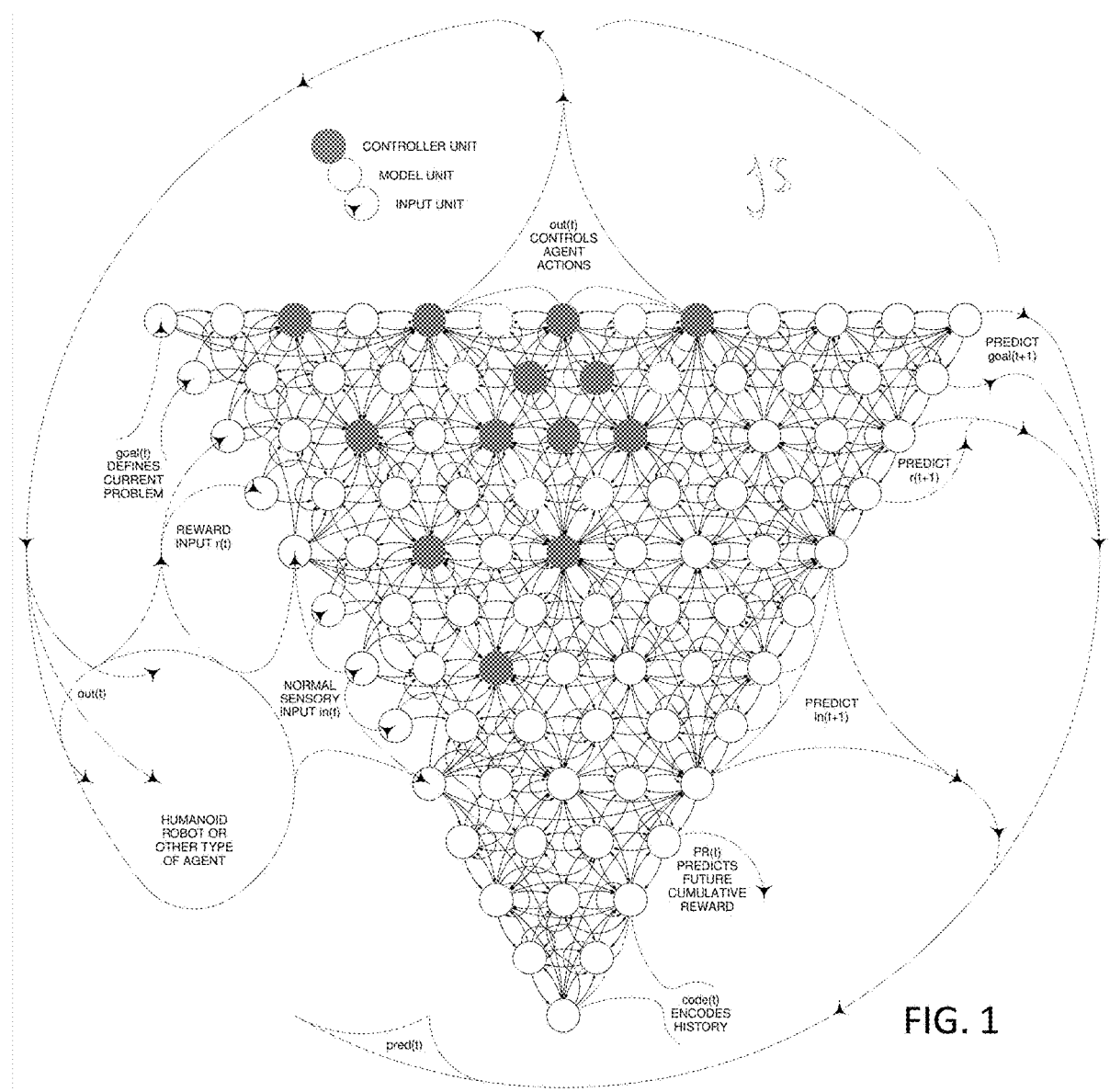
FIG. 1 is a schematic representation of an exemplary recurrent neural network (referred to herein as ONE) coupled to a humanoid agent or other type of process to be controlled.

This application relates to a recurrent neural network or the like (referred to herein as ONE) and a method of incrementally training ONE to perform new tasks of control or prediction, while preserving the ability to perform previously-learned tasks. FIG. 1 is a schematic representation of an exemplary ONE.

ONE, according to the illustrated implementation, has several different kinds of nodes (units) including input units, model units, and controller units. In a typical implementation, the input units receive input data (e.g., about the real world outside of ONE) from one or more electronic data sources, such as agents, sensors (on the agents or otherwise), electronic databases, etc. In a typical implementation, the model units model one or more aspects of the real world outside of ONE based the input data ONE receives. Moreover, in a typical implementation, the controller units interact with and control or influence ONE's external environment, which may include one or more computer-based components. For example, the illustrated implementation shows an exemplary external agent in the form of an advanced humanoid robot. However, the external computer-based components can be virtually any component, whose behavior can be controlled or influenced, by ONE or in response to ONE's output. Some examples include industrial processes to be controlled by ONE, such as plants that produce chemical substances or pharmaceuticals, all kinds of robots used in manufacturing of products such as T-Shirts or toys, self-driving cars, agents that act in virtual environments such as video games, artificial financial agents that automatically re-allocate portfolios of stocks or other financial securities to maximize profit or minimize volatility or other financial objectives, etc. In the illustrated figure, each input unit is represented by a circle with an internal arrow head, each model unit is represented by an empty circle, and each controller unit is represented by a darkened circle.

The various units (input, model, and controller) are connected to one another, for example, as shown, by a plurality of connections, each of which is represented in the illustrated figure by a line connecting two of the corresponding circles together. Each connection generally facilitates communication of data from a first one of the connected nodes to a second one of the connected nodes in at least a directed manner, with the direction of communication being indicated by the associated arrowhead. Within ONE, each input unit is connected to a plurality of model units and at least one controller unit, each model unit is connected to one or more other model units and some of the model units are connected to one or more of the controller units. Furthermore, each input unit is connected to at least one controller unit, while each controller unit is connected to a plurality of model units, and/or a plurality of other controller units. Every node in ONE can be connected to several other nodes.

The input units receive input data from multiple time-varying data sources that are located outside of ONE. The time-varying data sources can include, for example, one or more sensors, cameras, microphones, or the like in the agent or elsewhere. The sensors can detect light, temperature, sound, vibration, motion, pressure, voice, proximity, location, velocity, fire, smoke, humidity, carbon dioxide, carbon monoxide, air quality, etc.). The time-varying data sources can include an electronic database or the like, with the time-varying data including data from the electronic database. The data sources are considered time-varying because, over time, the data being provided by the sources may change (e.g., as time progresses or as conditions outside of ONE change). In the illustrated implementation, the input units are configured to receive at discrete time step t (t=1,2, 3 . . . ) of a given trial several real-valued, vector-valued inputs: a goal input, goal(t), a reward input, r(t), and a normal sensory input, in(t) from time-varying data sources outside of ONE. The goal input uniquely defines a goal or task at time t for ONE and/or its external agent to perform or strive for. The reward input represents positive or negative feedback from outside ONE (e.g., from the external agent representing something akin to "pleasure" or "pain" being experienced by the agent at time "t"). The normal sensory input represents various other data collected by sensors outside of ONE (e.g., in the agent) about the environment outside of ONE (e.g., near the agent).

The controller units control or influence one or more components external to ONE, such as the agent shown in FIG. 1. In this regard, the controller units are configured to send time-varying output signals to the one or more external components. The one or more external components generally respond to receiving the time-varying output signals from the controller units in a predictable and predetermined manner. The time-varying output signals are generally derived, at least in part, from the time-varying input data to ONE and may leverage modeling performed by one or more of the model units in ONE. In the illustrated implementation, the controller units are configured to provide, as time-varying real-valued, vector-valued output signals, an output signal, out(t); a history encoding signal code(t), and a collection of prediction signals, pred(t) that includes a goal prediction signal of goal(t+1), a reward prediction signal of r(t+1), a normal sensory input prediction signal of in(t+1), and a future cumulative reward prediction signal PR(t).

The output signal controls or influences the environment outside of ONE (e.g., by controlling the agent's actions). In this regard, the output signal can be sent to any components outside of ONE that are meant to be controlled or influenced by ONE (e.g., the agent). The history encoding signal may be sent to an external computer database to store an indication of ONE's historical performance; it may help ONE to come up with better internal representations of the history so far, e.g., disentangled representations. The goal prediction signal predicts a future goal for ONE (and/or its agent) at a future time (t+1). The reward prediction signal predicts a reward that ONE may receive (e.g., from its external agent) at a future point in time (t+1). The normal sensory input prediction signal of the next input in(t+1) predicts the normal sensory inputs that ONE will receive (e.g., from its external agent) at a future point in time (t+1). The future cumulative reward prediction signal PR(t) predicts a future cumulative reward to be obtained in the current trial (based on actions by ONE and/or its agent). In the illustrated implementation, the prediction signals may be trained based on the input observations of one or more sensors of the external components intended to be controlled by ONE (e.g., the external agent). The various output signals, including the predictions, may be based generally on modelling of ONE's external environment by the model units, and may be influenced by the inputs received at ONE as well.

Figure 2:
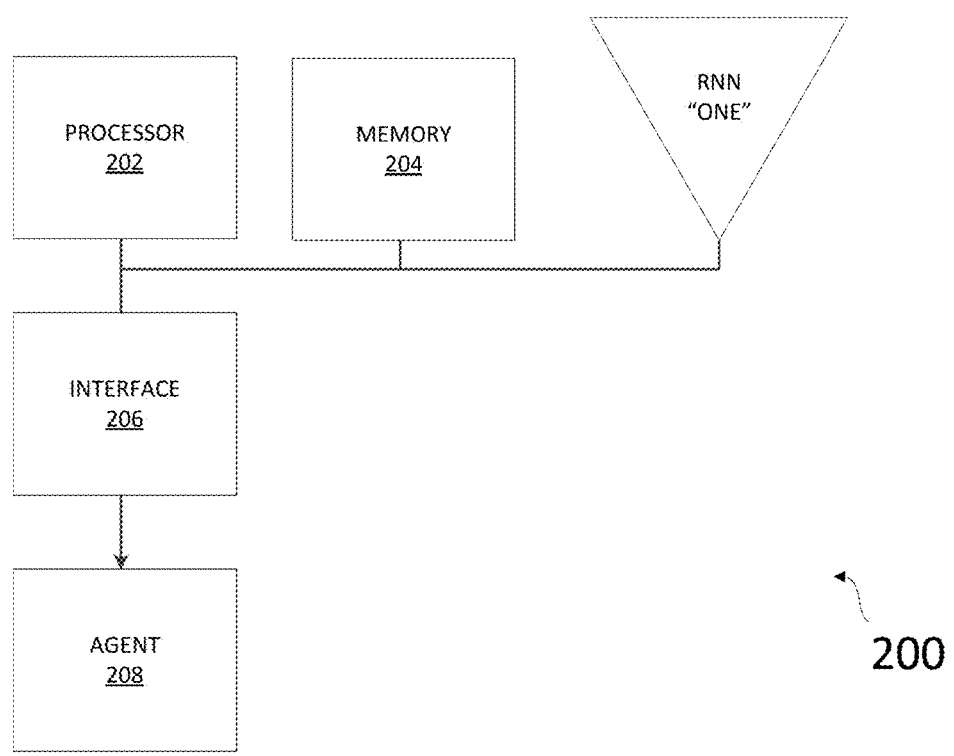
FIG. 2 is a schematic representation of an exemplary system 200 that includes ONE and other components.

FIG. 2 is a schematic representation of an exemplary system 200 that includes RNN ONE, a separate computer-based processor 202, a separate computer-based memory 204, a computer-based interface 206 to the external environment, such as ONE's agent 208 (and/or sensors, which may or may not be within the agent). In various implementations, the computer-based processor 202, and memory 204, which may include computer-readable instructions that causes the processor to interact with ONE so as to facilitate, prompt and/or cause one or more of the functionalities disclosed herein as being attributable to ONE. The computer-based interface 206 facilitates communications between system 200 (including ONE) and ONE's external environment, including ONE's agent and/or any other external computer-based components, etc.

Figure 3:
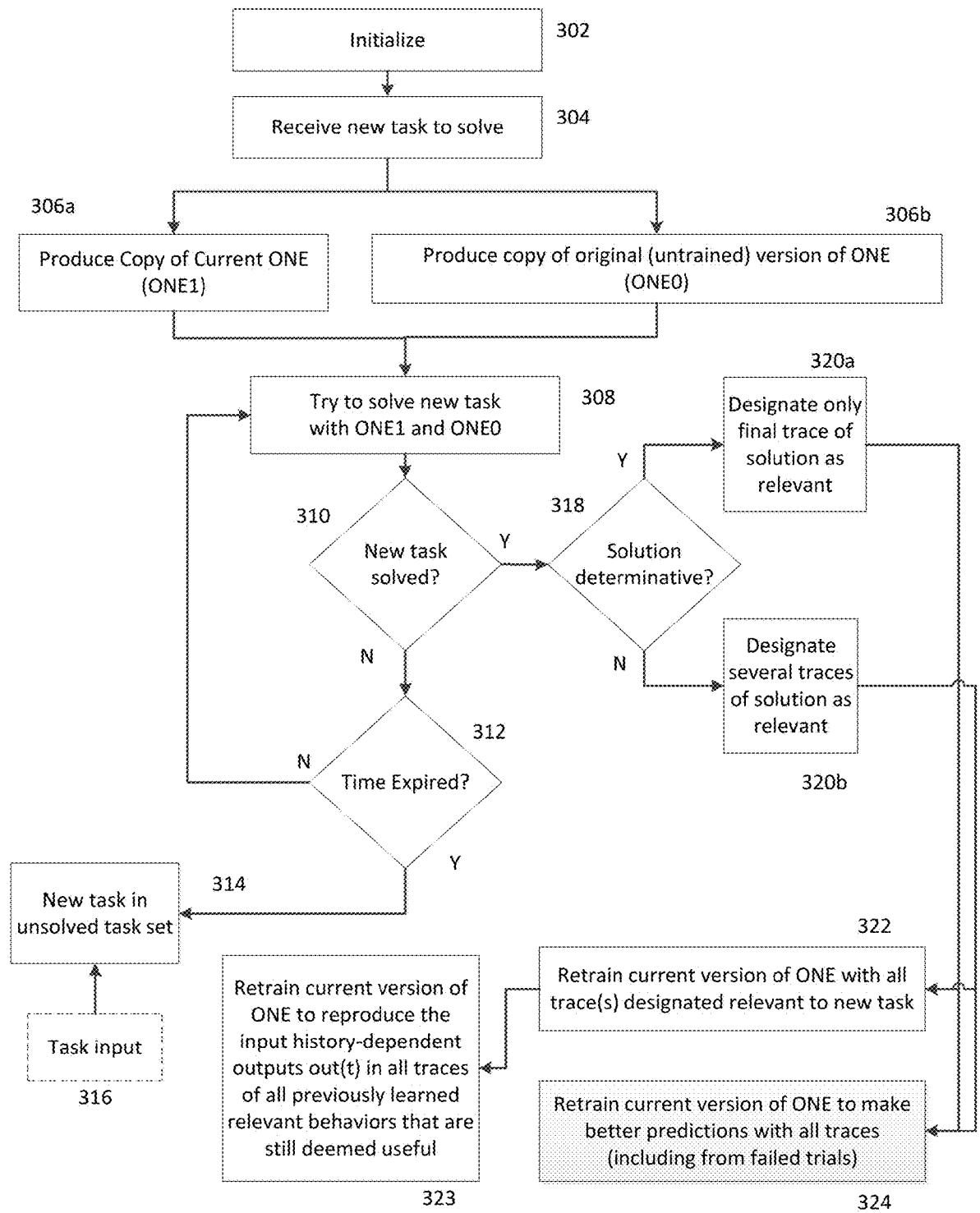
FIG. 3 is a flowchart that represents an exemplary process by which ONE can be trained to perform new tasks and to make better predictions, while preserving ONE's ability to perform one or more (or all) previously-learned tasks.

FIG. 3 is a flowchart that represents an exemplary process by which ONE can be trained to perform new tasks and to make better predictions, while preserving ONE's ability to perform one or more (or all) previously-learned tasks. The flowchart, and the description that follows, is written as if ONE were part of a larger computer system, such as system 200 in FIG. 2.

The process, according to the illustrated implementation, has an initialization step (at 302). The initialization step can include any one or more of a variety of different functions. In one example, during the initialization step (302), the processor 202 may access certain information about, including, e.g., global variables for, ONE including: a present version of ONE and its current weights, positive real-valued variables (e.g., c, and k) that define one or more search time budgets that may be referenced and utilized during the training process, and a control task description A E TAU from a possibly infinite set of possible task descriptions TAU.

Next, in the process, according to the illustrated implementation, the system 200 at 304) receives or identifies a new goal or task to be solved (performed) by ONE. In some instances, the new goal or task is received by the system 200 from a human user's interactions with the system 200. For example, the human user may speak an audible command or request that the user wishes ONE or ONE's agent to perform. The audible command or request may be captured by a microphone coupled to ONE or to ONE's agent. Alternatively, the human user may enter the command or request through a keyboard or other type of user interface device coupled to ONE. In other instances, the new task or goal may come from a database of tasks or goals (stored, e.g., in memory 204) that the system 200 has not yet learned to solve or perform. These tasks or goals may be based on previously-received user commands or requests. Typically, unless a goal or task description has been received at the system 200 through normal system inputs, if there are tasks or goals that the system 200 has not yet learned to solve or perform in memory, the system 200 may select a unique, one of those—(e.g., a real-valued, vector-valued, p-dimensional, task-specific goal input G(A))—for ONE to solve or perform. If there are no such task-specific goals in memory at a particular point in time, then G(A) may consist of a vector having p zeros (where p is some natural, positive number).

Next, the system 200 attempts to solve the task or perform the goal.

In this regard, according to the illustrated process, the system 200 (at 306a) produces a copy of the current version of ONE (call this copy of current ONE: ONE1), and a copy of the original (untrained) version of ONE (call this copy of the original ONE: ONE0). ONE0 is essentially identical to the original version of ONE, before it received any training.

In a particular example, ONE, in its original (untrained) state may not have been able to perform any particular tasks because it hadn't yet been trained to perform any particular tasks. However, by some later point in time, ONE may have been trained to perform as many as 100 new control tasks (or more). If, at this time, ONE were called upon to learn yet another new control task (i.e., task number 101), then the system 200, according to an exemplary method, would produce two new versions, or copies, of ONE: (A) ONE0, which would be identical to the original (untrained) version of ONE, not able to perform any particular tasks, and B) ONE1, which would be identical to the current version of ONE, and able to perform 100 different control tasks, as well as numerous prediction tasks.

Next, according to the illustrated implementation, the system 200 (at 308) tries to solve the new control task using both ONE1 and ONE0. In this regard, the system 200 may apply trial-based black box optimization processes to all (or at least some) of the weights in ONE1 and ONE0 (typically the weights of connections to and from controller units). The optimization process may be applied to the two ONEs (ONE1 and ONE0) in a parallel manner, in an intervening manner, or in any other manner that involves spending at least an approximately equal amount of time on both ONEs (ONE1 and ONE0). The system 200 typically allocates some finite amount of time c for solving the new task (i.e., for ONE1 or ONE0 to come up with a solution).

The system 200, according to the illustrated process, continues trying to solve the new task (with both ONE1 and ONE0) until the task has been solved (at 310) or the allocated time limit, defined by c, has expired (at 312).

Typically, the system 200 (at 310) will conclude that the task has been solved if either ONE0 or ONE1 has solved the task sufficiently well. Only one of the ONEs (ONE0 or ONE1) needs to solve the task sufficiently well for the system to reach this conclusion; it is not necessary that both ONEs (ONE0 and ONE1) solve the task. In a typical implementation, the system 200 (at 310) determines whether a task has been solved sufficiently well, according to some predetermined (and stored in memory) termination criterion, where, for example, for ONE0 and/or ONE1 for all time steps t of any given trial, $G(A)=goal(t)=constant$. Generally speaking, if the task or solution is deterministic, such that trials are repeatable exactly, then the system 200 may conclude (at 310) that the task has been solved sufficiently well, if ONE1 or ONE0 has solved the task at least once. If, on the other hand, the task or solution is not determinative and there is some variability in trial outcomes even when successful, then the system 200 may conclude (at 310) that the task has been learned sufficiently well (at 310) if trial results satisfy some predetermined criteria. For example, if the task is not determinative, then the system (200) may conclude that the task has been solved sufficiently well if a certain percentage (e.g., 50%, 60%, 70%, 80%, etc.) of attempts end up being successful. The criteria (i.e., the percentage required by the system in this regard) may be stored, for example, in the system's 200 computer-based memory 204. In some implementations, the system may be configured so as to allow a human user to specify the criteria for assessing sufficiency of the solution.

If (at 312) the search time budget (of c seconds) has been expended and the system (using ONE1 and ONE0) has not yet solved the new task, then, according to the illustrated process, the system 200 terminates the attempt to solve that task and (at 314) checks to see if there are any other new tasks that need to be solved (e.g., in the database of unsolved tasks). As indicated by task input 316, typically, the database of unsolved control tasks can be populated by user requests for tasks to be performed (i.e., task inputs 316). If a new unsolved task is identified in the database, then the algorithm returns to steps 306a and 306b to produce two versions of ONE: ONE1 and ONE0, which will be used to try to solve the newly identified task, subject to timing criteria and sufficiency criteria, like those mentioned above.

If the control task is solved (at 310)— by ONE1 or ONE0—and the solution (at 318) is determinative, then the system 200 (at 320a) designates only the final trace of the solution—by ONE1 or ONE0—as being relevant (i.e., relevant for training ONE to perform the new task). This is because, if the solution is determinative, such that the trials are repeatable exactly only one trace—the correct one, trace(t), which is typically the final (successful) trace—is needed for training purposes. If, on the other hand, the task is solved (at 310)— by ONE1 or ONE0—and the solution (at 318) is not determinative, then the system 200 (at 320b) designates more than one trace of the solution—from ONE1 or ONE0—as being relevant (i.e., relevant for training ONE to perform the new task). This is because, if the solution is not determinative, and the trials, therefore, are not repeatable exactly, to gain statistical significance and thus ensure that ONE ends up being trained well, a broader collection of traces is used to do the training. The specific number of traces marked as relevant at this point can vary.

In many (but not all) cases, it is expected that ONE1 (the trained version of ONE) will solve the new task before ONE0. This is because previously-learned programs and/or subroutines already encoded in the weight matrix of ONE (e.g., prior to 306a and 306b) may help to greatly speed up ONE1's optimization process (at 308) in trying to learn the new task. ONE0, however, (at 308) tries to learn the new task from scratch. Thus, in a sense, ONE0 can be seen as playing the role of a safety belt in case ONE1 may have become "too biased" through previous learning (following the algorithmic transfer learning approach of the asymptotically Optimal Ordered Problem Solver, for example).

Next, in the illustrated implementation, the system (at 322) utilizes the trace or traces marked as relevant (in 320a or 320b) to train the current version of ONE to learn the new task. To continue the particular example that was started above, this step helps ONE evolve from being able to perform 100 control tasks to being able to perform 101 control tasks (including the original 100 tasks and the new 1 task).

In some instances, training ONE to learn the new task (at 322) could compromise ONE's ability to perform one or more of its previously-learned tasks (e.g., one of the original 100 control tasks it was trained to perform, or some of the numerous prediction tasks it may have learned in the past). In fact, in some instances, training ONE to learn the new task (at 322) could cause ONE to completely forget how to perform one or more of its previously-learned tasks.

Next, according to the illustrated process, the system 200 (at 323) retrains ONE to reproduce the input history-dependent outputs out(t) in all traces of all previously learned relevant control behaviors that are still deemed useful. To continue the particular example above, the system 200 (at 323) would retrain ONE to reproduce the input history-dependent outputs out(t) in all traces of all previously learned relevant behaviors (for previously-learned tasks 1 through 100, as well as the new task, 101). In some instances, one or more of the previously-learned tasks, for example, may be deemed no longer useful. In a typical implementation, the system 200 will have some criteria for assessing continued usefulness based on information stored, for example, in memory 204. The traces associated with any previously-learned, but no longer useful tasks can be discarded from the retraining step (at 323).

There are a variety of ways in which ONE may be retrained (at 323). One example is by using standard gradient-based learning to reproduce the input history-dependent outputs out(t) in all traces of all previously learned relevant behaviors that are still deemed useful (including those for the most recent task A learned by ONE1 or ONE0, if any). This is important because ONE1, for example, may have forgotten previous skills in step 308 and ONE1 or ONE0 may have not understood the goal input-dependence of the newly learned behavior for the new task.

Typically, the system assigns some time budget (e.g., c seconds) for retraining ONE (at 323).

Simultaneously, according to the illustrated implementation, the system 200 (at 324) uses all traces (including those of failed trials) to retrain ONE to make better predictions (e.g., pred(t), and code(t)), if any, given previous inputs and actions (but generally does not provide any target values for action outputs out(t) and corresponding PR(t) in replays of formerly relevant traces of trials of unsuccessful or superseded control behaviors implemented by earlier incarnations of ONE).

In a typical implementation, the system 200 may use one or more regularizers, implemented through the processor 202 executing computer-readable instructions stored in memory 204, for example, to compactify and/or simplify ONE as much as possible or practical.

In a typical implementation, the system 200 may also use ways of increasing the numbers of control units and model units and connections in ONE, implemented through the processor 202 executing computer-readable instructions stored in memory 204, to increase the learning capacity of ONE as more and more tasks have to be learned.

In view of the foregoing, it can be seen that, in a typical implementation, all prediction skills and/or still relevant goal-dependent control skills can be collapsed into ONE, without requiring new expensive interactions with the environment.

In view of the foregoing, it can further be seen that, in a typical implementation, ONE is configured so as to be particularly adept at incrementally learning so as to become an increasingly general problem solver. In this regard, ONE can learn new skills (e.g., how to solve a new task, and how to predict corresponding consequences of its action sequences), while retaining (or not forgetting) previous skills (e.g., how to solve other, previously-learned tasks, and how to predict consequences of previously executed action sequences). Moreover, ONE can be trained in a variety of ways including, for example, by utilizing various quite different methods, such as black box optimization/reinforcement learning/artificial evolution (especially for connections from and to controller units) as well as gradient-based supervised/unsupervised learning (especially for all other connections).

Figure 4:
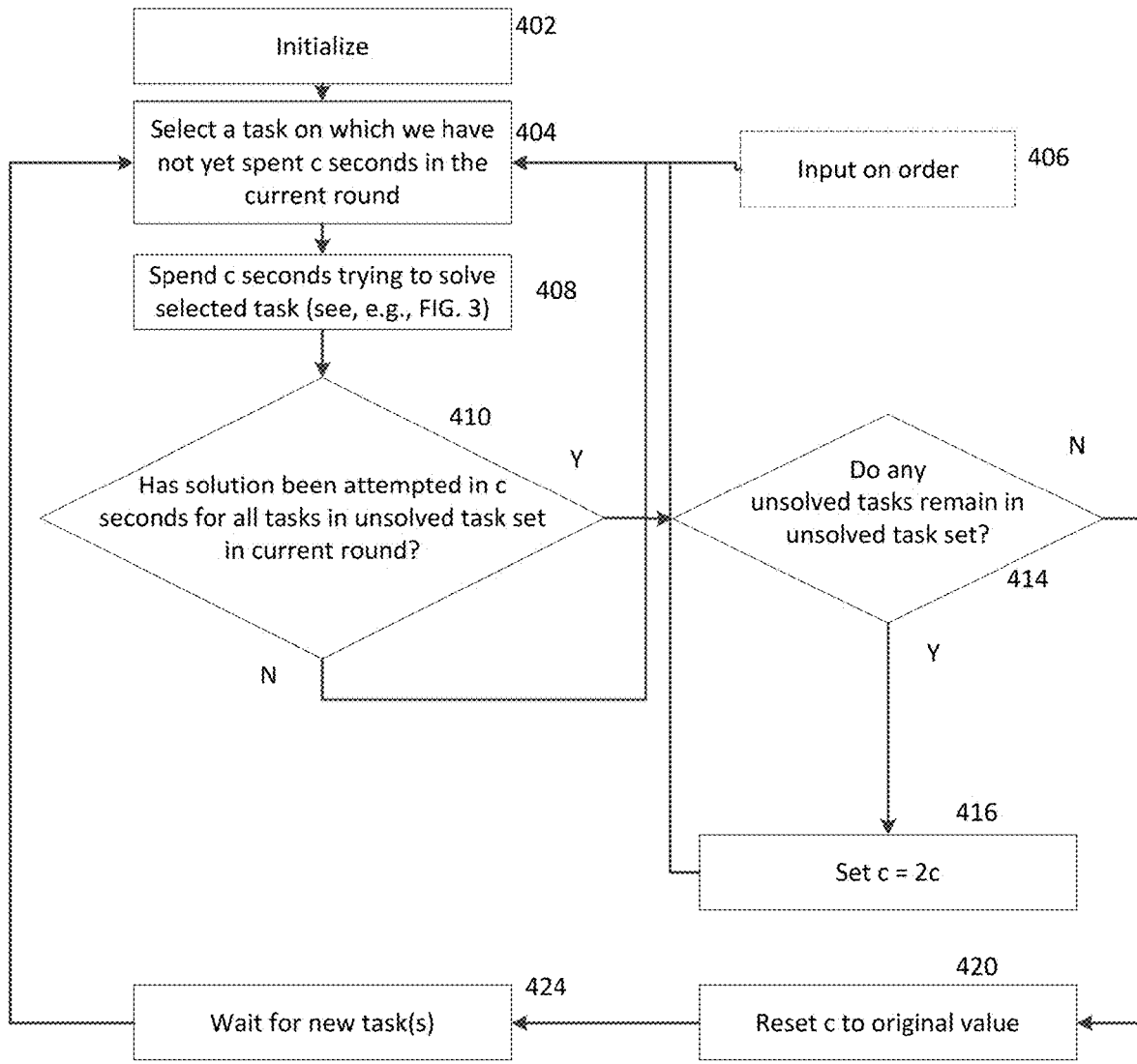
FIG. 4 is a flowchart that represents an exemplary process by which the system can automatically try to learn/solve, with ONE, a series of tasks.

FIG. 4 is a flowchart that represents an exemplary process by which the system 200 can automatically try to learn/solve, with ONE, a series of tasks.

The process, according to the illustrated implementation, shows an initialization step (at 402), which may be the same as initialization step 302. The initialization step can include any one or more of a variety of different functions. In one example, during the initialization step (402), the processor 202 may access certain information about, including, e.g., global variables for, ONE including: a present version of ONE and its current weights, positive real-valued variables (e.g., c, and k) that define one or more search time budgets that may be referenced and utilized during the training process, and a control task description A E TAU from a possibly infinite set of possible task descriptions TAU.

According to the illustrated process, the system 200 selects an unsolved task to solve from its unsolved task set in the database. There are a variety of ways in which the system 200 may make this selection. In some instances, the selection may be based on user input (see, e.g., 406) on selection order. In other instances, the selection may be based on a first-in-first-out (FIFO) or some other convenient ordering scheme.

Next, according to the illustrated process, the system 200 (at 408) performs steps 306a/306b-312 or 324 of FIG. 3, spending some amount of time (e.g., c seconds) on trying to solve the selected task. The system 200 may or may not be successful at solving the selected task in this attempt.

Next, according to the illustrated process, the system 200 considers (at 410) whether, in the current round of attempts, the system 200 has attempted to solve every task in the unsolved task set.

If (at 410), the system 200 determines that there are still tasks in the unsolved task set that the system 200 has not yet attempted to solve in the current round of attempts, the system 200 (returns to 404) selects one of them for solving.

If (at 410), the system 200 determines that, in the current round of attempts, it has attempted to solve every unsolved task that was in the unsolved task set, then the system 200 (at 414) considers whether any unsolved tasks still remain in the unsolved task set.

If the system 200 (at 414) determines that there are still unsolved tasks in the unsolved task set (and the system 200 has spent c seconds on trying to solve each of them), then the system 200 (at 416) increases c (e.g., by setting c=2c), and returns to 404 to select an unsolved task in for solving with ONE using the increased time budget (e.g., 2c).

If the system 200 (at 414) determines that there are no further unsolved tasks in the unsolved task set, then the system 200 (at 420) resets c to its original value, and waits (at 424) to receive a new task.

Thus, in a typical implementation, the system allocates some finite amount of time in each round (e.g., c seconds, or 2c seconds, or 4c seconds, etc.) on trying to solve each new task. Moreover, if the system 200 fails, the amount of time allocated to solving the new tasks may increase in each round. Finally, as the system 200 progresses through this process, ONE may be learning new tasks and, therefore, each time the system 200 returns to 408 to try to solve a selected task, ONE may be more sophisticated than in prior instances of trying to perform 408 and, therefore, more likely to succeed.

What follows is a specific example of some of the systems and techniques described herein (with some references to FIG. 1).

In this example, goal(t), r(t), in(t), out(t), pred(t), PR(t), code(t) are vectors of real numbers at discrete time step t of the current trial.

FIG. 1 shows a simplified diagram of an example of ONE. ONE contains input units (marked by little arrows), controller units (dark), and model units (white). At time t of a given trial, some input units are used to specify the current goal of ONE through a unique input pattern called goal(t), some are used to inform ONE about current reward signals r(t) from the agent's pain or pleasure sensors, and some are used to inform ONE about standard input signals in(t) from the agent's cameras or microphones or other sensors.

Some of the controller units generate an output pattern out(t) to influence an agent (or some other external process or component in an initially unknown environment) controlled by ONE. In FIG. 1, the agent is symbolized by the sketch of a humanoid robot (though the agent can be virtually any kind of controllable component or process) whose actions may change the environmental state. Thus out(t) may have an effect on subsequent perceptions r(t+1), in(t+1), out(t+1) at the next time step t+1.

Some of the model units generate an output pattern pred(t) at time t which predicts sense(t+1)=(r(t+1), in(t+1), goal(t+1)), others generate an output pattern code(t) that may represent a compact encoding of the history of actions and observations and ONE's computations so far, one of them generates a real value PR(t) to predict the cumulative reward until the end of the current trial. (Additional model output units may make additional types of predictions—not shown here.)

Each hidden unit in the schematic diagram of FIG. 1 may actually represent a more complex entity such as an LSTM cell. Also, the inputs may actually be pre-processed by complex networks such as convolutional neural networks (CNNs), which should also be considered parts of ONE as well.

In between two time steps t and t+1, there are several subsequent micro-steps called ticks, for example, 100 ticks. At each tick, ONE updates all of its units in parallel, using standard activation spreading in RNNs. Obviously, quite a few ticks are necessary until information has propagated from input units to all other units. It is the last tick of time step t that defines the final values of out(t), pred(t), code(t), PR(t), etc.

The set of all connections to and from controller units may be referred to as C. The set of all other connections may be referred to as M. Typically C is much smaller than M. All connections generally have a real-valued weight or strength. Training ONE means changing these weights based on experience.

Training can be performed in a number of ways. In one example, while C's weights are frozen, M's weights can be trained by gradient descent on the entire data observed so far (obtained throughout all previous trials), to minimize the deviation of its predictions pred(t) from sense(t+1) (thus better compressing the history so far), and to improve its encodings code(t). No further interaction with the environment is necessary for this. Similarly, while M's weights are frozen, C's weights can be trained on a new task by policy gradient methods or neuroevolution to maximize the cumulative reward per trial. To prevent forgetting, ONE is retrained on stored input/output traces of executions of the newly learned skill as well as previous skills that are still considered worth memorizing. Again, this can be done by gradient descent on the data so far, without additional expensive interaction with the environment.

In the illustrated implementation, ONE is wired up such that from each input or controller unit there is a path of connections leading to any controller unit. That is, in principle, C could learn a desired mapping from input sequences to action sequences without using M at all. For example, it could learn to set all weights of all connections to and from model units to zero, thus ignoring M.

However, C may often learn a new task more quickly by exploiting some of the algorithmic information previously learned by M, e.g., through using model units as pre-processors of the input history so far, or through using numerous ticks between time steps to "think about what M knows," by injecting patterns into model units and later reading out patterns from model units, thus perhaps learning to plan or to build useful analogies to previous experience of M.

Similarly, ONE is wired up such that from each input unit or model unit or controller output unit there is a path of connections leading to any model unit. That is, in principle M could learn a desired mapping from sequences of inputs and actions to predictions of consequences, without using C at all.

However, M may often learn to improve its predictions more quickly, by exploiting some of the algorithmic information acquired by C, e.g., through using hidden controller units as sources of additional information about the history so far, thus exploiting "what C knows."

Typically C is much smaller than M, because it is generally hard to train a large C (with a large search space of learnable weights or parameters) to solve tasks in an environment without a teacher. On today's computers, one can train through gradient descent an M with billions of adaptive parameters, while C (trained by policy gradients or evolution or other black box optimizers) typically can have at most millions of parameters. In such cases, the relatively few controller units should not be connected to all the model units, otherwise C may become way too large.

One natural way of restricting C is to arrange the units of ONE in a physical grid, thus introducing the concept of physical neighborhood between units, then placing most of the relatively few controller units physically close to each other, and enforcing many short connections and few long connections between ONE's units, like in the human brain.

To illustrate this, in FIG. 1, ONE is wired up in a 2-dimensional "small network topology" such that the number of connections of length $O(2^n)$ (n=1, 2, . . . , n_max) shrinks roughly exponentially as n grows linearly, although it is still possible to propagate information from any unit to any non-input unit within only O(n_max) ticks. Here, the minimal physical distance between two units defines the unit length of 1. Many other similar small net topologies are possible, of course.

Enforcing such a topological constraint, even when ONE grows (while being exposed to more and more tasks), by adding new hidden controller units in the vicinity of older ones (likewise for model units), C will grow very modestly, almost linearly with the number of controller units, simply because the average number of connections per unit remains almost constant, growing very slowly as the net is becoming bigger.

Additionally, the activation of a special controller unit called CblockM at time t can be multiplied onto all weights of connections from input to model units. That is, by setting CblockM to zero, C can temporarily block M from getting distracted by inputs while C may use M for thinking "high level abstract thoughts" through addressing and invoking some of the hidden model units. C can actually learn to do this to maximize reward per trial. Many similar tricks are possible to facilitate C's job of exploiting M when appropriate.

In a typical implementation, ONE collapses both C and M into a single net, and uses a particular way of incrementally learning to solve multiple tasks of control and prediction, such that the solution of each task may exploit in very general computable ways previously found solutions to other tasks, without forgetting the old solutions. Moreover, a simple and natural physical "small network" constraint on ONE's topology makes sure that the relatively hard-to-train controller units don't have too many trainable connections and learnable parameters even when there are many more (rather easily trainable) model units to profit from.

What follows is a non-limiting discussion of various aspects and particulars of the inventive concepts disclosed herein.

ONE Big RNN for Everything

Various approaches are available to facilitate incremental training of an increasingly general problem solver (e.g., ONE) to interact with an environment (e.g., by controlling an external agent), continually learning to solve new tasks (possibly without a supervisor), while preserving some (or all) previous, still-valuable skills/tasks.

ONE, or copies thereof, or parts thereof, can be trained in various ways, including, for example, by (1) black box optimization/reinforcement learning/artificial evolution without a teacher, or (2) gradient descent-based supervised or unsupervised learning. (1) is usually much harder than (2). In some implementations, these techniques (1) and (2) are combined in a way that leaves much if not most of the work to (2).

Various implementations of ONE facilitate or incorporate: (1) extra goal-defining input patterns to encode user-given tasks, (2) incremental black box optimization of reward-maximizing RNN controllers, (3) unsupervised prediction and compression of all data or all (or many) trials, (4) compressing all behaviors so far into ONE.

With respect to extra goal-defining input patterns to encode user-given tasks, a prior reinforcement learning neural controller, circa 1990, learned to control a fovea through sequences of saccades to find particular objects in visual scenes, thus learning sequential attention. User-defined goals were provided to the system by special "goal input vectors" that remained constant while the system shaped its incoming stream of standard visual inputs through its fovea-shifting actions. Also, circa 1990, gradient-based recurrent subgoal generators used special start and goal-defining input vectors, also for an evaluator network predicting the costs and rewards associated with moving from starts to goals. A later POWERPLAY system (circa 2011) also used such task-defining special inputs, actually selecting on its own new goals and tasks, to become a more and more general problem solver in an active but unsupervised fashion. Various implementations of ONE may adopt this concept of extra goal-defining inputs to encode user-given tasks to help distinguish between numerous different tasks.

With respect to incremental black box optimization of reward-maximizing RNN controllers, if, at some point in time, ONE already knows how to solve several tasks, then a copy of ONE may profit from this prior knowledge, learning a new task through additional weight changes more quickly than learning the task from scratch, ideally through optimal algorithmic transfer learning, similar to the asymptotically Optimal Ordered Problem Solver, where, for example, new solution candidates in form of programs may exploit older ones in arbitrary computable fashion.

With respect to unsupervised prediction and compression of all data of all trials, an RNN-based model M may learn to predict (and thus compress) future inputs including vector-valued reward signals from the environment of an agent controlled by an RNN-based controller C through environment-changing actions, where C and M are collapsed into a single RNN.

With respect to compressing all behaviors so far into ONE, a chunker-automatizer system of a neural history compressor used gradient descent to compress the learned behavior of a so-called "conscious" chunker RNN into a separate "subconscious" automatizer RNN, which not only learned to imitate the chunker network, but also was continually retrained on its own previous tasks, namely, (1) to predict teacher-given targets through supervised learning, and (2) to compress through unsupervised learning all sequences of observations by predicting them (what is predictable does not have to be stored extra). It was shown that this type of unsupervised pretraining for deep learning networks can greatly facilitate the learning of additional user-defined tasks. Here we apply the basic idea to the incremental skill training of ONE. Both the predictive skills acquired by gradient descent and the task-specific control skills acquired by black box optimization are collapsed into one single network (namely, ONE itself) through pure gradient descent, by retraining ONE on all input-output traces of all previously learned behaviors that are still deemed useful. Towards this end, ONE is retrained to reproduce control behaviors of successful past versions of ONE, but without really executing the behaviors in the environment (usually the expensive part). Simultaneously, all input-output traces ever observed (including those of failed trials) can be used to train ONE to become a better predictor of future inputs, given previous inputs and actions. Of course, this requires storing input-output traces of all trials (e.g., in a computer-based memory storage device, not shown in FIG. 1). That is, once a new skill has been learned, e.g., by a copy of ONE (or even by another machine learning device), e.g., through slow trial and error-based evolution or reinforcement learning, ONE can be retrained in through gradient-based methods on stored input/output traces of all previously learned control and prediction skills still considered worth memorizing. In particular, standard gradient descent through backpropagation in discrete graphs of nodes with differentiable activation functions can be used to squeeze many expensively evolved skills into the limited computational resources of ONE.

Regularizers can be used to further compress ONE, possibly shrinking it by pruning neurons and connections, similar to what has been proposed for deep learning multilayer perceptron, see, e.g., A. G. Ivakhnenko and V. G. Lapa. *Cybernetic Predicting Devices*. CCM Information Corporation, 1965, A. G. Ivakhnenko. Polynomial theory of complex systems. *IEEE Transactions on Systems, Man and Cybernetics*, (4):364-378, 1971, and J. Schmidhuber, *On learning to think: Algorithmic information theory for novel combinations of reinforcement learning controllers and recurrent neural world models*. Preprint arXiv: 1511.09249, 2015. This forces ONE even more to relate partially analogous skills (with shared algorithmic information) to each other, creating common sub-programs in form of shared subnetworks of ONE. This may greatly speed up subsequent learning of novel but algorithmically related skills, through reuse of such subroutines created as by-products of data compression, where the data are actually programs encoded in ONE's previous weight matrices.

So, in a typical implementation, ONE continually collapses more and more skills and predictive knowledge into itself, compactly encoding shared algorithmic information in re-usable form, to learn new problem-solving programs more quickly.

More Formally: ONE and its Self-Acquired Data

Let m, n, o, p, q, s denote positive integer constants, and i, k, h, t, $\tau$ positive integer variables assuming ranges implicit in the given contexts. The i-th component of any real-valued vector, v, is denoted by $v_i$. For convenience, let us assume that ONE's life span can be partitioned into trials $T_1, T_2, \ldots$. In each trial, ONE attempts to solve a particular task, trying to manipulate some unknown environment (e.g., an external agent) through a sequence of actions to achieve some goal. Let us consider one particular trial T and its discrete sequence of time steps, $t=1, 2, \ldots, t_T$.

At the beginning of a given time step, t, ONE receives a "normal" sensory input vector, $in(t) \in R^m$, and a reward input vector, $r(t) \in R^n$. As an example, in(t), or parts of in(t), may represent pixel intensities of an incoming video frame from the external agent, while r(t), or components of r(t), may reflect external positive rewards, or negative values produced by "pain" sensors (e.g., sensors on the agent that measure excessive temperature or pressure or low battery load ("hunger")). Inputs in(t) may also encode user-given goals or tasks, e.g., through commands spoken by a human user to the external agent (and captured by a microphone on the agent). Often, however, it is convenient to use an extra input vector $goal(t) \in R^l$ to uniquely encode and/or enter user-given goals. Let $sense(t) \in R^{m+p+n}$ denote a concatenation of the vectors in(t), goal(t) and r(t). The total reward at time t is $R(t)=\Sigma_{i=1}^n r_i(t)$. The total cumulative reward up to time t is $CR(t)=\Sigma_{\tau=1}^t R(\tau)$. During time step t, ONE computes during several micro steps an output action vector, $out(t) \in R^o$, which may influence the environment and thus future $sense(\tau)$ for $\tau > t$.

Training a Copy of ONE on New Control Tasks without a Teacher

In some implementations, one of ONE's goals is to maximize $CR(t_T)$. Towards this end, copies of successive instances of ONE may be made, and then trained in a series of trials through methods that incorporate black box optimization (see, e.g., FIG. 3 and the discussion thereof), for example, through incremental neuroevolution, hierarchical neuroevolution, hierarchical policy gradient algorithms, and/or asymptotically optimal ways of algorithmic transfer learning. Given a new task and a version of ONE trained on several previous tasks, such hierarchical/incremental methods, etc. may create a copy of the current ONE, freeze its current weights, then enlarge the copy of ONE by adding a few new units and connections which are trained until the new task is satisfactorily solved. This process can reduce the size of the search space for the new task, while giving the new weights the opportunity to learn to use certain frozen parts of ONE's copy as subroutines. (Of course, it is also possible, and in some instances it happens, to simply retrain all weights of the entire copy to solve the new task). Typically, the input-output traces of these trials are sufficient to retrain ONE (see, e.g., FIG. 3) without further interaction with the environment.

Unsupervised ONE Learning to Predict/Compress Observations

ONE may, and in some implementations does, profit from unsupervised learning that compresses the observed data into a compact representation that may make subsequent learning of externally posed tasks easier. Hence, in some implementations, a goal of ONE is to compress ONE's entire growing interaction history of all failed and successful trials, e.g., through neural predictive coding. For this purpose, ONE may have m+n special output units to produce for $t < t_T$ a prediction $pred(t) \in R^{m+n}$ of sense(t+1) from ONE's previous observations and actions, which are in principle accessible to ONE through (recurrent) connections. In one case, this contributes $\| pred(t) - sense(t+1) \|^2$ to the error function to be minimized by gradient descent in ONE's weights (see, e.g., FIG. 3). This will train ONE so that pred(t) becomes more like the expected value of sense (t+1), given the past. See, e.g., J. Schmidhuber and S. Heil. Sequential neural text compression. *IEEE Transactions on Neural Networks*, 7(1):142-146, 1996, J. Schmidhuber. Developmental robotics, optimal artificial curiosity, creativity, music, and the fine arts. *Connection Science,* 18(2):173-187, 2006, and/or J. Schmidhuber. On learning to think: Algorithmic information theory for novel combinations of reinforcement learning controllers and recurrent neural world models. *Preprint arXiv:* 1511.09249, 2015, for ways of translating such neural predictions into compression performance. Similar prediction tasks could also be specified through particular prediction task-specific goal inputs goal(t), like with other tasks.

Training ONE to Predict Cumulative Rewards

In some implementations, ONE may have yet another set of n special output units to produce for $t<t_T$ another prediction $PR(t) \in R^{n+1}$ of $r(t+1)+r(t+2)+\ldots+r(t_T)$ and of the total remaining reward $CR(t_T)$— $CR(t)$. Unlike in the present application, predictions of expected cumulative rewards can be considered essential in traditional reinforcement learning where they are usually limited to the case of scalar rewards (while ONE's rewards may be vector-valued). Of course, in principle, such cumulative knowledge is already implicitly present in a ONE that has learned to predict only next step rewards r(t+1). However, explicit predictions of expected cumulative rewards may represent redundant but useful derived secondary features that further facilitate black box optimization in later incarnations of steps 308 et seq. in FIG. 3, which may discover useful subprograms of the RNN making good use of those features.

Adding Other Reasonable Objectives to ONE's Goals

In some implementations, additional objectives are added to ONE's goals. For example, we may give ONE another set of q special output units and train them through unsupervised learning to produce for $t<t_T$ a vector $code(t) \in R^q$ that represents an ideal factorial code of the observed history so far, or that encodes the data in related ways that are generally considered useful.

No Fundamental Problem with Bad Predictions of Inputs and Rewards

In some instances, it may not be very important that ONE becomes a good predictor of inputs including cumulative rewards. In fact, in noisy environments, perfect prediction may be very difficult (or, perhaps, impossible). The learning of solutions of control tasks (see, e.g., in FIG. 3), however, generally does not essentially depend on good predictions, although it might profit from internal subroutines of ONE that at least occasionally yield good predictions of expected future observations in form of pred(t) or PR(t).

Likewise, control learning may profit from, but does not existentially depend on near-optimal codes. To summarize, ONE's subroutines for making codes and predictions may or may not help to solve control problems, where it is ONE's task to figure out when to use or ignore those subroutines.

Store Behavioral Traces

In some implementations, to be able to retrain ONE on all observations ever made, the system may store ONE's entire, growing, lifelong sensory-motor interaction history including all inputs and goals and actions and reward signals observed during all successful and failed trials, including what initially looks like noise but later may turn out to be regular. This is feasible today (and may be done utilizing computer-based memory storage). On the other hand, in some applications, storage space may be limited, and it may be desirable to store (and re-train on) only some (low-resolution variants) of the previous observations, selected, for example, according to certain user-given criteria. This does not fundamentally change the basic setup—ONE may still profit from subroutines that encode such limited previous experiences, as long as they convey algorithmic information about solutions for new tasks to be learned.

Incrementally Collapse all Previously Learned Skills into ONE

Let all(t) denote a concatenation of sense(t), out(t) and pred(t) (and in some implementations PR(t) and/or code(t), if any). Let trace(T) denote the sequence (all(1), all(2), . . . , all($t_T$)). The system can use efficient, gradient-based learning to compress all relevant aspects of trace($T_1$), trace($T_2$), . . . into ONE, and thus compress (all) control and prediction skills learned so far by previous instances of ONE (or even by separate machine learning methods), preventing ONE not only from forgetting previous knowledge, but also making ONE discover new relations and analogies and other types of mutual algorithmic information among subroutines implementing previous skills. Typically, given a ONE that already knows many skills, traces of a new skill learned by a copy of ONE are added to the relevant traces, and compressed into ONE, which is also re-trained on traces of the previous skills.

At any given time, an acceptable task is to solve a previously solved task with fewer computational resources such as time, space, energy, etc., generally as long as this does not worsen performance on other tasks. In some implementations, the system focuses on pure gradient descent.

Learning Goal Input-Dependence Through Compression

After Step 310 (in the process of FIG. 3), a copy of ONE may have been modified and may have learned to control an agent (e.g., if the agent is in a video game, the agent may have learned to reach a given goal or point in a maze indicated through a particular goal input, e.g., one that looks like the goal). However, the weight changes of ONE's copy may be insufficient to perform this behavior exclusively when the corresponding goal input is on. And it may have forgotten previous skills for finding other goals, given other goal inputs. Nevertheless, the gradient-based phase (in 322 et seq. in FIG. 3) generally can correct and fine-tune those behaviors, making them goal input-dependent in a way that would be hard for typical black box optimizers such as those that utilize neuroevolution.

The setup is also sufficient for high-dimensional spoken commands arriving as input vector sequences at certain standard input units connected to a microphone. The non-trivial pattern recognition required to recognize commands such as "go to the north-east corner of the maze" will require a substantial subnetwork of ONE and many weights. We cannot expect neuroevolution to learn such speech recognition within reasonable time. However, a copy of ONE may rather easily learn by neuroevolution during the process in FIG. 3 to always go to the north-east corner of the maze, ignoring speech inputs. In a later incarnation, a copy of another instance of ONE may rather easily learn to always go to the north-west corner of the maze, again ignoring corresponding spoken commands such as "go to the north-west corner of the maze." In the consolidation phase (near the end of the FIG. 3 process), ONE may rather easily learn the speech command-dependence of these behaviors through gradient-based learning, without having to interact with the environment again.

Discarding Sub-Optimal Previous Behaviors

Once ONE has learned to solve some control task in suboptimal fashion, it may later learn to solve it faster, or with fewer computational resources. That's why the process in FIG. 3 does not generally involve retraining ONE to generate action outputs out(t) in replays of formerly relevant traces of trials of superseded controllers implemented by earlier versions of ONE. However, replays of unsuccessful trials can still be used to retrain ONE to become a better predictor or world model, given past observations and actions.

Algorithmic Information Theory (AIT) Argument

According to the Theory of Algorithmic Information (AIT) or Kolmogorov Complexity, given some universal computer, U, whose programs are encoded as bit strings, the mutual information between two programs p and q is expressed as K(q|p), the length of the shortest program ω that computes q, given p, ignoring an additive constant of O(1) depending on U (in practical applications the computation will be time-bounded). That is, if p is a solution to problem P, and q is a fast (say, linear time) solution to problem Q, and if K(q|p) is small, and ω is both fast and much shorter than q, then asymptotically optimal universal search for a solution to Q, given p, will generally find ω first (to compute q and solve Q), and thus solve Q much faster than search for q from scratch. We can directly apply this AIT argument to ONE. For example, suppose that ONE has learned to represent (e.g., through predictive coding) videos of people placing toys in boxes, or to summarize such videos through textual outputs. Now suppose ONE's next task is to learn to control a robot that places toys in boxes. Although the robot's actuators may be quite different from human arms and hands, and although videos and video-describing texts are quite different from desirable trajectories of robot movements, ONE's knowledge about videos is expected to convey algorithmic information about solutions to ONE's new control task, perhaps in form of connected high-level spatio-temporal feature detectors representing typical movements of hands and elbows independent of arm size. Training ONE to address this information in its own subroutines and partially reuse them to solve the robot's task may be much faster than learning to solve the task from scratch with a fresh network.

Gaining Efficiency by Selective Replays

Instead of retraining ONE in a sleep phase (e.g., at the tail end of the process represented in FIG. 3) on all input-output traces of all trials ever, the system may also retrain it on parts thereof, by selecting trials randomly or otherwise, and replaying them to retrain ONE in standard fashion. Generally speaking, we cannot expect perfect compression of previously learned skills and knowledge within limited retraining time spent in a particular invocation of that portion of the process. Nevertheless, repeated incarnations of that portion of the process will, over time, improve ONE's performance on all tasks so far.

Heuristics: Gaining Efficiency by Tracking Weight Variance

As a heuristic, the system may track the variance of each weight's value at the ends of all trials. Frequently used weights with low variance can be suspected to be important for many tasks, and may get small or zero learning rates during the process of FIG. 3, thus making them even more stable, such that the system does not easily forget them during the learning of new tasks. Weights with high variance, however, may get high learning rates in the process of FIG. 3, and thus participate easily in the learning of new skills. Similar heuristics go back to the early days of neural network research. They can protect ONE's earlier acquired skills and knowledge to a certain extent, to facilitate retraining in later portions of the process of FIG. 3.

Gaining Efficiency by Tracking Which Weights Are Used for Which Tasks

To avoid forgetting previous skills, instead of replaying all previous traces of still relevant trials (a simpler option to achieve the appropriate criterion, for example), one can also implement ONE as a self-modularizing, computation cost-minimizing, winner-take-all RNN. Then the system can keep track of which weights of ONE are used for which tasks. That is, to test whether ONE has forgotten something in the wake of recent modifications of some of its weights, only input-output traces in the union of affected tasks have to be re-tested.

Ordering Tasks Automatically

In general, given a set of tasks, no teacher knows the best sequential ordering of tasks, to make ONE learn to solve all tasks as quickly as possible. However, given is a set of tasks, which may actually be the set of all tasks with computable task descriptions, or a more limited set of tasks, some of them possibly given by a user. In unsupervised mode, one variant systematically searches the space of possible pairs of new tasks and modifications of the current problem solver, until it finds a more powerful problem solver that solves all previously learned tasks plus the new one, while the unmodified predecessor does not. The greedy search variant uses time-optimal program search to order candidate pairs of tasks and solver modifications by their conditional computational (time and space) complexity, given the stored experience so far. The new task and its corresponding task-solving skill are those first found and validated. This biases the search toward pairs that can be described compactly and validated quickly. The computational costs of validating new tasks need not grow with task repertoire size.

Simple Automatic Ordering of ONE's Tasks

A related, more naive, but easy-to-implement strategy is given in the process of FIG. 4, which temporally skips tasks that it currently cannot solve within a given time budget, trying to solve them again later after it has learned other skills, eventually doubling the time budget if any unsolved tasks are left.

A number of embodiments of the invention have been described. Nevertheless, it will be understood that various modifications may be made without departing from the spirit and scope of the invention.

For example, in various implementations, ONE may be implemented utilizing one or more computer-based processors executing computer executable instructions stored in one or more computer-readable media. Moreover, in some implementations, ONE may be incorporated into and form part of the processor and memory shown in FIG. 2. ONE (and other processors, memory, etc.) may be incorporated into the agent. In that case, any communications that ONE has with its external environment would include communications with the agent, within which ONE is contained. ONE may be located in a single physical location or may be distributed across multiple physical locations with part of ONE in a first physical location and at least one second part of ONE in a separate, physically distinct (even remote) location.

ONE may be part of an overall computer-based system that includes one or more other processing elements, other computer-based memory storage devices, user-interface devices, such as keyboards, touchscreens, microphones, sensors, etc. In such implementations, the system is generally configured to perform functionalities that facilitate ONE, enable ONE and/or cause ONE to perform one or more of the functions disclosed herein.

Various aspects of ONE may be implemented through software executing on one or more computer-based processors.

ONE's agent may be virtually any kind of physical system, component, or process facilitated or performed by a physical system or component. ONE's agent may include any one or more of a variety of different kinds of sensors, etc. Moreover, ONE's agent may include any one or more of a variety of different kinds of devices or components that are able to perform, or cause to be performed, actions. These devices or components may be or include any one or more of a variety of motors, actuators, etc.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In various embodiments, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification can be implemented as operations performed by a data processing apparatus (e.g., a processor) on data stored on one or more computer-readable storage devices or received from other sources. The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

The systems and techniques disclosed herein can be utilized in any one or more of a wide variety of end applications, including, for example, automated driving for cars.

Other implementations are within the scope of the claims.

What is claimed is:

1. A method comprising:
providing a computer system that comprises a computer-based processor, a computer-based memory, and a trained version of a recurrent neural network (RNN), wherein the trained version of the RNN comprises a plurality of processors configured to produce a sequence of real-valued activations;
producing a copy of the trained version of the RNN;
producing an untrained version of the RNN prior to any training;
applying a control task for solving to the copy of the trained version of the RNN and to the untrained version of the RNN; and
in response to the copy of the trained version of the RNN or the untrained version of the RNN solving the control task sufficiently well to produce a solution:
retraining the trained version of the RNN with one or more traces, that include one or more sequences of inputs and outputs from the solution;
retraining the trained version of the RNN based on one or more traces associated with other prior task solutions; and
retraining the trained version of the RNN based on previously observed traces to predict environmental inputs, including rewards, and other data that includes consequences of executed control actions;
designating a finite amount of time for solving the control task with the copy of the trained version of the RNN and with the untrained version of the RNN; and
in response to the designated finite amount of time expiring, adding the control task into an unsolved task set stored in a computer-based memory.

2. The method of claim 1, wherein trying to solve applying the control task for solving comprises:
applying trial-based black box optimization to weights in the copy of the trained version of the RNN and the untrained version of the RNN.

3. The computer-based method of claim 1, further comprising:
receiving the control task to be solved at the computer system from a human user interacting with the computer system or with an agent of the computer system; and determining whether the control task has been solved sufficiently well, wherein determining whether the task has been solved sufficiently well comprises:
recognizing that the copy of the trained version of the RNN or the untrained version of the RNN has solved the task at least once, if trials for the control task are repeatable exactly, or
recognizing that the copy of the trained version of the RNN or the untrained version of the RNN has solved the task some predetermined number or percentage of times, more than once, if trials for the control task are not repeatable exactly.

4. The computer-based method of claim 1, further comprising:
if the control task is solved and trials for a task are repeatable exactly, designating only a final trace of the solution as being relevant for retraining the trained RNN on a new task; or
if the control task is solved and trials for the task are not repeatable exactly, designating more than one trace of the solution as being relevant for retraining the trained RNN on a new task.

5. The computer-based method of claim 1, further comprising:
utilizing the trace or traces marked as relevant for retraining the trained version of the RNN on a new task,
wherein retraining the trained version of the RNN based on one or more traces associated with other prior task solutions comprises:
retraining the trained RNN to reproduce input history-dependent outputs in all traces of al previously learned relevant behaviors; and
retraining the RNN based on previously observed traces to predict environmental inputs and the other data that includes consequences of executed control actions.

6. In a computer system, a computer-based method comprising:
producing a copy of a trained version of a recurrent neural network (RNN);
producing an untrained version of the RNN prior to any training;
applying a control task for solving to the copy of the trained version of the RNN and the untrained version of the RNN; and
in response to the copy of the trained version of the RNN or the untrained version of the RNN solving the control task sufficiently well to produce a solution:
retraining the trained version of the RNN with one or more traces, that include one or more sequences of inputs and outputs, from the solution;
retraining the trained version of the RNN based on one or more traces associated with other prior task solutions; and
retraining the trained version of the RNN based on previously observed traces to predict environmental inputs, that include rewards, and other data including consequences of executed control actions.

7. The computer-based method of claim 6, further comprising: designating a finite amount of time for solving the control task with the copy of the trained version of the RNN and with the untrained version of the RNN; and in response to the designated finite amount of time expiring and no solution to the control task having been produced, adding task into an unsolved task set stored in a computer-based memory.

8. The computer-based method of claim 7, wherein the copy of the trained version of the RNN and the untrained version of the RNN solve the task in a parallel or interleaving manner within the designated finite amount of time.

9. The computer-based method of claim 6, wherein applying the control task for solving comprises:
applying trial-based black box optimization to weights in the copy of the trained version of the RNN and the untrained version of the RNN.

10. The computer-based method of claim 6, further comprising:
receiving the control task to be solved at the computer system from a human user interacting with the computer system or with an agent of the computer system.

11. The computer-based method of claim 6, further comprising:
determining whether the control task has been solved sufficiently well, by:
recognizing that the copy of the trained version of the RNN or the untrained version of the RNN has solved the task at least once, if trials for the control task are repeatable exactly, or
recognizing that the copy of the trained version of the RNN or the untrained version of the RNN has solved the task some predetermined number or percentage of times, more than once, if trials for the control task are not repeatable exactly.

12. The computer-based method of claim 6, further comprising:
if the control task is solved and trials for the control task are repeatable exactly, designating only a final trace of a solution to the control task as being relevant for retraining the copy of the trained version of the RNN on a new task; or
if the control task is solved and trials for the control task are not repeatable exactly, designating more than one trace of the solution to the control task as being relevant for retraining the copy of the trained version of the RNN on the control task.

13. The computer-based method of claim 6, further comprising: utilizing final trace or one or more traces designated as relevant for retraining the copy of the trained RNN on the control task to retrain the copy of the trained RNN.

14. The computer-based method of claim 6, wherein retraining the copy of the trained version of the RNN based on one or more traces associated with other prior task solutions comprises:
retraining the copy of the trained version of the RNN to reproduce input history-dependent outputs in all traces of all previously learned relevant behaviors that are still deemed useful; and
retraining the copy of the trained version of the RNN based on previously observed traces to predict environmental inputs and other data that includes consequences of executed control actions.

15. The computer-based method of claim 14, further comprising:
determining whether previously learned relevant behaviors that are still deemed useful by applying criteria for assessing continued usefulness based on information stored in computer-based memory.

16. The computer-based method of claim 14, wherein retraining the copy of the trained version of the RNN utilizes gradient-based learning to reproduce the input history-dependent outputs in all traces of all previously learned relevant behaviors that are still deemed useful.

17. The computer-based method of claim 6, further comprising:

utilizing all traces, including those from failed trials, to retrain the copy of the trained version of the RNN to improve predictions.

18. The computer-based method of claim 6, further comprising performing one or more predictions and one or more controls with the copy of the trained version of the RNN.

19. The computer-based method of claim 6, further comprising:
receiving, at one or more input units of the copy of the trained version of the RNN, input data about a real world outside of the copy of the trained version of the RNN from one or more electronic data sources;
predicting or modeling, with one or more model units of the copy of the trained version of the RNN, one or more aspects of the real world outside of the copy of the trained version of the RNN based on the input data; and
interacting with and/or controlling or influencing one or more computer-based components in the real world outside of the copy of the trained version of the RNN.

20. The computer-based method of claim 6, further comprising:
determining whether the computer system has spent a predetermined amount of time unsuccessfully trying to solve a particular task in an unsolved task set stored in computer-based memory; and if so, spending more than the predetermined amount of time subsequently working on a solution to the particular task in the unsolved task set again.

21. A method comprising:
providing a computer system that comprises a computer-based processor, a computer-based memory;
performing an initialization step wherein the computer-based processor accesses a present version of a trained a recurrent neural network (RNN), current weights for the trained RNN, positive real-valued variables that define one or more search time budgets for use in a training process for the version of trained the RNN, and a new control task description from a set of possible task descriptions, wherein the trained RNN has been trained to perform a plurality of tasks;
producing a copy of the trained version of the RNN;
producing an untrained version of the RNN, wherein the untrained version of the RNN has not been trained to perform any tasks;
applying trial-based black box optimization processes to at least some of the weights in the copy of the trained version of the RNN and in the untrained version of the RNN, while allocating a finite amount of time defined in one or more of the search time budgets for solving a new task with the copy of the trained version of the RNN and the untrained version of the RNN;
concluding that the new task has been solved if at least one of either the copy of the trained version of the RNN or the untrained version of the RNN has solved 44e a task sufficiently well, wherein, if the task or solution is deterministic, such that trials are repeatable exactly, then the computer system concludes that the task has been solved sufficiently well, if either the copy of the trained version of the RNN or the untrained version of the RNN has solved the task at least once, and wherein, if the task or solution is not determinative and there is some variability in trial outcomes even when successful, then the computer system concludes that the task has been learned sufficiently well if trial results satisfy a predetermined criteria;
terminating an attempt to solve the new task if the finite amount of time defined in one or more of the search time budgets has been expended and the system, using the copy of the trained version of the RNN and the untrained version of the RNN, has not yet solved the new task, and then checking to see if there are any other new tasks that need to be solved in a database;
if another new unsolved task is identified in the database, then producing a second copy of the trained version of the RNN, producing a second untrained version of the RNN; and applying trial-based black box optimization processes to at least some of the weights in the copy of the second trained version of the RNN and in the second untrained version of the RNN.

22. The method of claim 21, wherein if the computer system determines that there are still unsolved tasks in the database and the computer system has spent the finite amount of time to spend to solve each of them unsuccessfully, then the computer system increases the finite amount of time to spend, and returns to select an unsolved task for solving with the increased finite amount of time.

23. The method of claim 22, wherein if the computer system determines that there are no further unsolved tasks in the database, then the computer system resets the finite amount of time to spend trying to solve to its original value and waits to receive a new task.

* * * * *